United States Patent [19]

Chen

[11] Patent Number: 4,987,764
[45] Date of Patent: Jan. 29, 1991

[54] METHOD FOR MANUFACTURING A SEAT POST OF A BICYCLE

[76] Inventor: Chin-Pei Chen, No. 198, Feng Chou Rd., Shen Kang Hsiang, Taichung Hsien, Taiwan

[21] Appl. No.: 451,921

[22] Filed: Dec. 18, 1989

[51] Int. Cl.⁵ .............................................. B21D 53/86
[52] U.S. Cl. ...................................... 72/367; 297/195
[58] Field of Search .................... 72/367, 369; 297/195

[56] References Cited

U.S. PATENT DOCUMENTS

| | | | |
|---|---|---|---|
| 3,688,550 | 9/1972 | Stanley | 72/369 |
| 4,263,799 | 4/1981 | Motizuki | 72/367 |
| 4,275,922 | 6/1981 | Juy | 297/195 |
| 4,421,357 | 12/1983 | Shimano | 297/195 |

FOREIGN PATENT DOCUMENTS 2409182  7/1979  France ............................... 297/195

Primary Examiner—Lowell A. Larson
Attorney, Agent, or Firm—Zarley, McKee, Thomte, Voorhees, & Sease

[57] ABSTRACT

A method for manufacturing a seat post of a bicycle includes the following processes: tapering a free end of a cylindrical tube so as to form a tapered end; bending the tapered end of the cylindrical tube so as to form a bent end; forming the bent end of the cylindrical tube so as to form a seat support; and drilling a hole in the seat support.

1 Claim, 5 Drawing Sheets

METHOD FOR MANUFACTURING A SEAT POST OF A BICYCLE

BACKGROUND OF THE INVENTION

The present invention relates to a method for manufacturing a seat post of a bicycle, and more particularly to a method for manufacturing a seat post of a bicycle which has a seat support integrally formed on a top end of the seat post.

A conventional bicycle seat post is shown in FIG. 6. A reduced diameter potion R is formed on an upper end of the seat post S. A lower support L is fixed on an upper end of the reduced diameter portion R by means such as welding or a screw joint. A seat frame F of a seat cushion C is clamped between an upper support U and the lower support L which are clamped together by a clamp plate P and a bolt B. One disadvantage of manufacturing this conventional seat post is that the lower support L is manufactured separated so that the manufacturing process is complex and time consuming, especially the process for welding the lower support L to the reduced diameter portion R of the seat post S.

Another conventional manufacturing method is that the lower support L and the seat post S are made by a casting process so that they are integrally formed. Though the lower support L and the seat post S are integrally formed, the manufacturing process is still very complex, the weight of the seat post is large which is adverse for shipping and transportation. In addition, a porous structure may be inadvertently formed in the casting process so that the strength of the connection between the lower support L and the upper end of the seat post S is low.

The present invention has arisen to mitigate and/or obviate the afore-described disadvantages of the conventional bicycle seat posts.

SUMMARY OF THE INVENTION

The primary objective of the present invention is to provide a method for manufacturing the seat post of a bicycle, in which a support and the seat post are formed integrally and the overall manufacturing process is simplified.

In accordance with one aspect of the invention, there is provided a method for manufacturing a seat post of a bicycle which includes the following processes: tapering a free end of a cylindrical tube so as to form a tapered end; bending the tapered end of the cylindrical tube so as to form a bent end; forming the bent end of the cylindrical tube so as to form a set support; and drilling a hole in the seat support.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
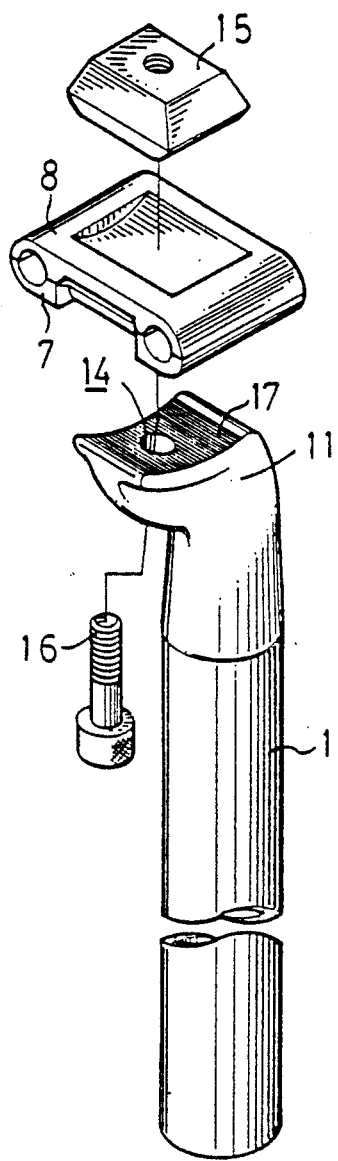
FIG. 1 is a perspective view of a seat post with a seat support integrally formed on an upper end of the seat post.

Referring to the drawings and initially to FIG. 1 a seat post made by a method in accordance with the present invention is generally a cylindrical tube 1 with a seat support 11 integrally formed on an upper end thereof. The seat support 11 extends along a direction substantially perpendicular to a longitudinal axis of the cylindrical tube 1. A hole 14 is formed in the seat support 11. A concave surface 17 is formed on an upper end of the seat support 11. A lower support 7 and an upper support 8 are separately provided above the seat support 11 and are clamped on the seat support 11 by a clamp plate 15 and a bolt 16. The lower support 7 has a convex surface corresponding to the concave surface 17 of the seat support 11 so that the lower support 7 can be stably supported on these at support 11 without weld. A seat frame of a seat cushion (not shown) is fixed between the lower support 7 and the upper support 8.

Figure 2:
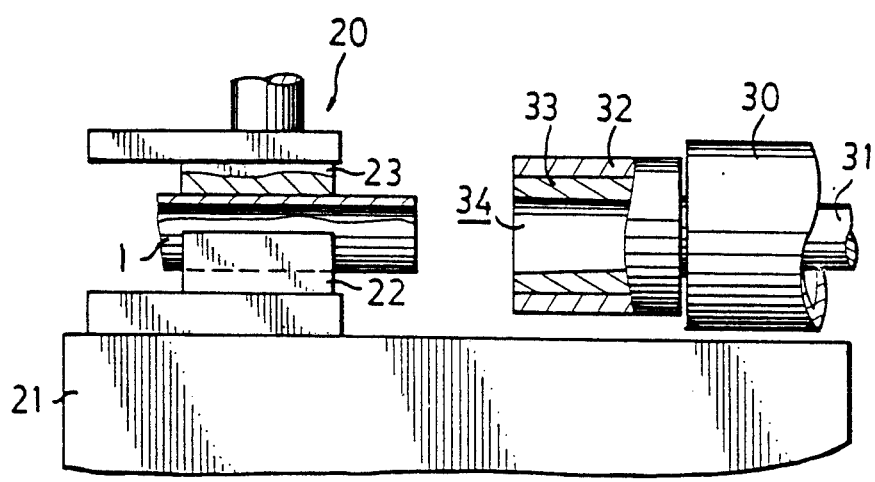
FIG. 2 is a partial cross-sectional view illustrating a clamping mechanism for a tapering process of the method in accordance with the present invention.

Referring next to FIG. 2, illustrated is a means for operating a tapering process of the method for manufacturing the seat post of a bicycle in accordance with the present invention. The cylindrical tube 1 is horizontally clamped by a clamping mechanism 20. The clamping mechanism 20 includes a fixed element 22 which is fixed on a working table 21 and a movable element 23. The cylindrical tube 1 is clamped between the fixed element 22 and the movable element 23 and arranged so that a portion of one end of the cylindrical tube 1 extends beyond the clamping mechanism 20. A cylindrical head 32 is fixed on a free end of a piston rod 31 of an actuator 30 and a mold 33 is force-fitted within the cylindrical head 32. A radially inward tapered hole 34 is formed in the mold 33 and opens toward the clamping mechanism 20. The diameter of the open end of the tapered hole 34 is slightly larger than the outer diameter of the cylindrical tube 1. The diameter of the closed end of the tapered hole 34 is smaller than the outer diameter of the cylindrical tube 1. The head 32 and the mold 33 are pushed forward by the actuator 30 so that the fee end of the cylindrical tube 1 is force fitted into the tapered hole 34 such that a taper is formed on the free end of the cylindrical tube 1. Alternatively, the tapered hole 34 may be formed directly in the head 32 instead of being formed in the mold 33.

Figure 3:
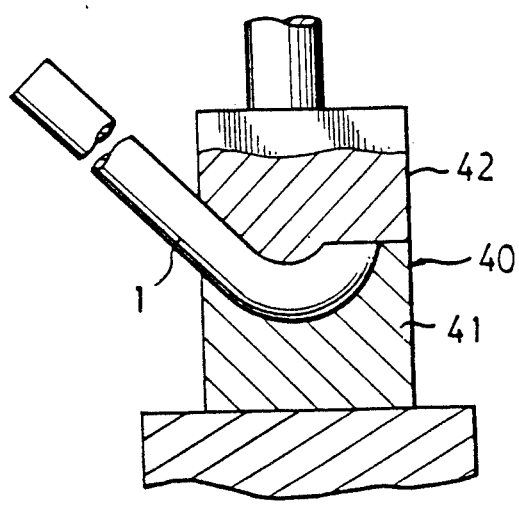
FIG. 3 is a partial cross-sectional view illustrating a mold for a bending process.

Referring next to FIG. 3, the cylindrical tube 1 with a tapered end is subjected to a bending process. A bending mold 40 includes a lower mold 41 and an upper mold 42 having a mold cavity of a predetermined shape formed therebetween. The upper mold 42 is movable so that the tapered end of the cylindrical tube 1 is shaped by the bending mold 40. The tapered end of the cylindrical tube 1 is thus formed with a suitable curvature.

Figure 4:
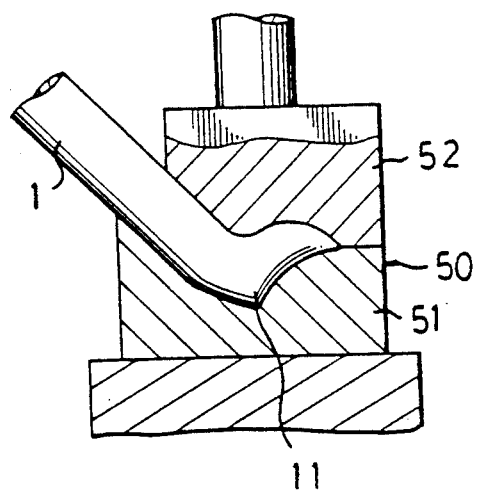
FIG. 4 is a partial cross-sectional view illustrating a mold for a forming process.

Referring next to FIG. 4, the cylindrical tube 1 with a bent end is subjected to a forming process. A forming mold 50 includes a lower mod 51 and an upper mold 52 having a mold cavity of a predetermined shape formed therebetween. The upper mold 52 is movable so that the bent end of the cylindrical tube 1 is shaped by the forming mold 40 and such that a seat support 11 of a predetermined shape is integrally formed on the upper end of the cylindrical tube 1. The last process is drilling a hole 14 through the seat support 11 so that a seat cushion is fixed directly on the seat support 11.

Figure 5:
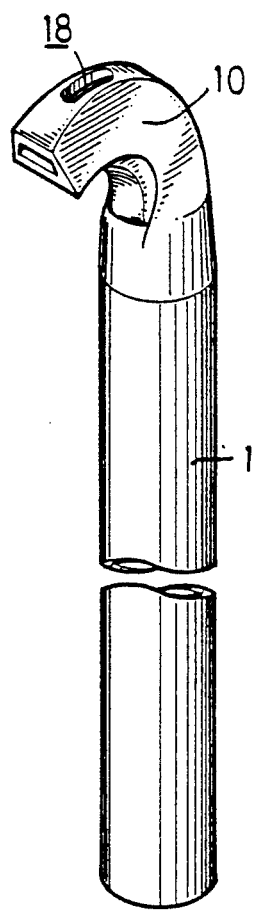
FIG. 5 is a perspective view of a second embodiment of seat post.
Figure 6:
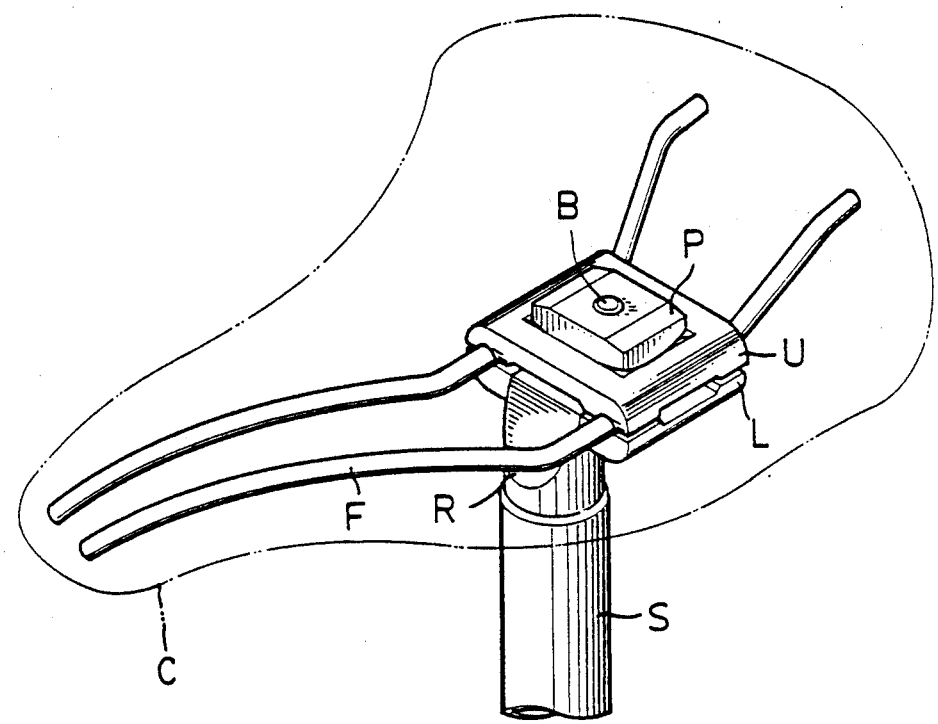
FIG. 6 is a partial perspective view of a conventional seat post.

Referring next to FIG. 5, illustrated is a second embodiment of the cylindrical tube 1. A seat support 10 which has a shape different from that of the seat support 11 shown in FIG. 1 is integrally formed on the upper end of the cylindrical tube 1 and is formed by the manufacturing method as described above. The shapes of the mold cavities of the bending mold 40 and the forming mold 50 are both different from that of the respective molds in the method described above. The last process in the manufacture is forming an elongate hole 18 in the seat support 10.

Accordingly, the present invention has the following advantages:

(a) The manufacturing processes are simplified so that productivity is greatly increased.

(b) No welding process is required.

(c) No porous structure is inadvertently formed so that the strength of the seat support 10, 11 is high.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for manufacturing a seat post of bicycle, said seat post being substantially a cylindrical tube with a seat support integrally formed thereon, said method comprising:

tapering a free end of said cylindrical tube so as to form a tapered end, said cylindrical tube being clamped by a clamping mechanism and being arranged such that said free end thereof extends beyond said clamping mechanism, a first mold being disposed beside said clamping mechanism and relatively movable toward said clamping mechanism, a tapered hole which is radially tapered inwards being formed in said first mold and opening toward said clamping, and said tapered end being formed on said free end of said cylindrical tube when said first mold moves toward said clamping mechanism;

bending said tapered end of said cylindrical tube so as to form a bent end, said tapered end being placed between a first lower mold and a first upper mold each having a first mold cavity formed therein, said bent end being formed when one of said first lower mold and said first upper mold moves toward the other, and said bent end being formed with a curvature;

forming said bent end of said cylindrical tube so as to form said seat support, said bent end being placed between a second lower mold and a second upper mold each having a second mold cavity formed therein, said seat support being formed when one of said second lower mold and said second upper mold moves toward the other; and drilling a hole in said seat support;

whereby said seat support and said seat post are integrally formed together, and said seat support has a high strength.

* * * * *